United States Patent
Burgmeier et al.

(10) Patent No.: US 11,797,271 B2
(45) Date of Patent: *Oct. 24, 2023

(54) DYNAMIC WEB-BASED INTEGRATED DEVELOPMENT ENVIRONMENT

(71) Applicant: INTUIT INC., Mountain View, CA (US)

(72) Inventors: Amanda Burgmeier, Saratoga, CA (US); Kevin M. Mccluskey, San Diego, CA (US); Yuhua Xie, Walnut Creek, CA (US); Nikhil Dvidedi, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,588

(22) Filed: Jul. 28, 2022

(65) Prior Publication Data

US 2022/0365759 A1    Nov. 17, 2022

Related U.S. Application Data

(63) Continuation of application No. 17/075,540, filed on Oct. 20, 2020, now Pat. No. 11,487,510.

(51) Int. Cl.
*G06F 8/33* (2018.01)
*H04L 67/02* (2022.01)

(52) U.S. Cl.
CPC ............... *G06F 8/33* (2013.01); *H04L 67/02* (2013.01)

(58) Field of Classification Search
CPC .................................. G06F 8/33; H04L 67/02
(Continued)

(56) References Cited

U.S. PATENT DOCUMENTS 6,256,773 B1 * 7/2001 Bowman-Amuah ..... G06F 8/71
707/999.203
6,442,748 B1 * 8/2002 Bowman-Amuah .......................
G06F 9/4493
707/999.009

(Continued)

OTHER PUBLICATIONS

Di Nitto, Elisabetta, et al. "A journey to highly dynamic, self-adaptive service-based applications." Automated Software Engineering 15.3 (2008): pp. 313-341. (Year: 2008).*

(Continued)

*Primary Examiner* — Satish Rampuria
(74) *Attorney, Agent, or Firm* — Patterson + Sheridan, LLP

(57) ABSTRACT

Certain aspects of the present disclosure provide techniques for establishing a web session between a computing device and a web-based integrated development environment to create and/or update files (e.g., content files and/or resource files). In the web session, content file(s) can be evaluated in real-time with one or more resource files. Further, in the web session, a set of validation rules of a resource file can be updated by the computing device. To stablish the web session, a first communication connection is established between the computing device and the web-based integrated development environment. With the first communication established, a second communication connection is established for real-time, bi-directional communication between the computing device and a language server instance of the web-based integrated development environment.

20 Claims, 7 Drawing Sheets

(58) Field of Classification Search
USPC .................................. 717/100–119, 168–178
See application file for complete search history.

(56) References Cited

U.S. PATENT DOCUMENTS

| | | | | |
|---|---|---|---|---|
| 7,139,999 | B2* | 11/2006 | Bowman-Amuah | G06Q 10/06 717/100 |
| 9,369,544 | B1* | 6/2016 | Morgan | G06F 11/3684 |
| 10,152,315 | B1* | 12/2018 | Olague | G06Q 20/10 |
| 10,423,709 | B1* | 9/2019 | Bradley | G06F 16/22 |
| 2013/0205277 | A1* | 8/2013 | Seven | G06F 8/70 717/121 |
| 2017/0093867 | A1* | 3/2017 | Burns | H04L 63/107 |

OTHER PUBLICATIONS

Dugan, Joanne Bechta, Kevin J. Sullivan, and David Coppit. "Developing a low-cost high-quality software tool for dynamic fault-tree analysis." IEEE Transactions on reliability 49.1 (2000): pp. 49-59. (Year: 2000).*

Rode, Jochen, et al. An end-user development perspective on state-of-the-art web development tools. Department of Computer Science, Virginia Polytechnic Institute & State University, 2005.pp. 1-32 (Year: 2005).*

Felmetsger, Viktoria, et al. "Toward automated detection of logic vulnerabilities in web applications." USENIX Security Symposium. vol. 58. 2010.pp. 1-18 (Year: 2010).*

Sprenkle, Sara, et al. "Automated replay and failure detection for web applications." Proceedings of the 20th IEEE/ACM international conference on automated software engineering. 2005.pp. 253-262 (Year: 2005).*

Vargas, Hector, et al. "A network of automatic control web-based laboratories." IEEE Transactions on learning technologies 4.3 (2010): pp. 197-208. (Year: 2010).*

* cited by examiner

DYNAMIC WEB-BASED INTEGRATED DEVELOPMENT ENVIRONMENT

CROSS-REFERENCE TO RELATED APPLICATIONS

This Application is a continuation of co-pending U.S. patent application Ser. No. 17/075,540, filed Oct. 20, 2020, the contents of which are incorporated herein by reference in their entirety.

INTRODUCTION

Aspects of the present disclosure relate to a dynamic web-based integrated development environment for developers.

BACKGROUND

Developers of software program products, including software applications, utilize various types of development environments to create and update software program products. For example, developers can utilize online integrated development environments, which are also known as web or cloud-based integrated development environments. A developer can access features of the web-based integrated development environment through a web browser. One such feature is a source code editor that includes syntax highlighting, error diagnostics, auto-completion, etc. The web browser of the web-based integrated development environment allows developers to create and update software program products on client computing devices such as a laptop or tablet.

However, a shortcoming of the web-based integrated development environment is that there is just one language backend server with one set of validation rules for a domain specific language. The language backend server of the web-based integrated development environment loads the same resource file, including the same set of validation rules for each editing session, and applies the same set of validation rules to content file(s).

As a result of such shortcoming, a software program developer utilizing the web-based integrated development environment to create and update content files for a software program has only one set of defined validation rules for each editing session. The developer is unable to switch and apply a different set of validation rules because the web browser provided as part of the web-based integrated development environment can only operate with the one set of validation rules.

Therefore, a solution is needed that can overcome the shortcomings of the conventional method of developing software program products.

BRIEF SUMMARY

Certain embodiments provide a method of a dynamic web-based integrated development environment interacting with a client computing device. The method includes receiving a call from a computing device to initiate a web session in a web-based integrated development environment. The method further includes initiating the web session with the computing device and a first language server instance, wherein the first language server instance coupled to a backend server includes a first resource file with a first set of rules. The method further includes loading a content file to the web session. The method further includes applying the first set of rules to the content file in the web session. The method further includes evaluating, based on the application of the first set of rules, the content file. The method further includes receiving a selection of a second set of rules in a second resource file associated with a second language server instance coupled to the backend server. The method further includes applying the second set of rules to the content file in the web session. The method further includes evaluating, based on the application of the second set of rules, the content file. The method further includes providing the evaluation of the content file to the computing device.

Certain embodiments provide a method of a computing device interacting with a dynamic web-based integrated development environment. The method includes establishing a first communication connection with a web-based integrated development environment. The method further includes receiving via the first communication connection a web browser from the web-based integrated development environment. The method further includes providing a request for a web session via the web browser. The method further includes receiving via a second communication connection with the web-based integrated development environment the web session that includes: a first resource file and a content file. The method further includes receiving a first evaluation of the content file based on the first resource file. The method further includes updating the content file in the web session. The method further includes receiving a second evaluation of the updated content file based on the first resource file. The method further includes requesting a second resource file. The method further includes receiving a third evaluation of the updated content file based on the second resource file.

Other embodiments provide systems to perform the aforementioned methods associated with a web-based integrated development environment and/or a client computing device interacting with the web-based integrated development environment. Additionally, other embodiments provide non-transitory computer-readable storage mediums comprising instructions for performing the aforementioned methods.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
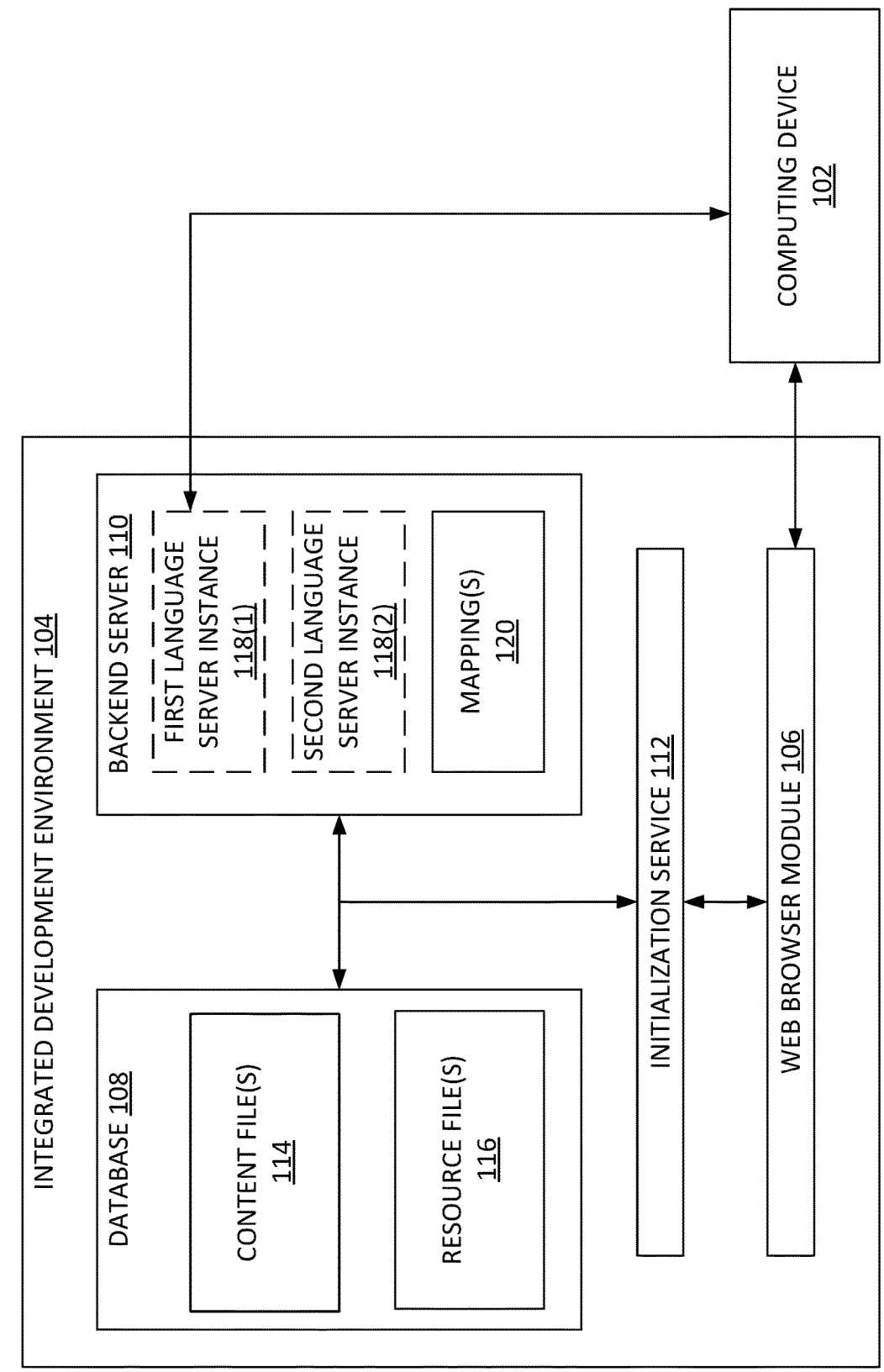
FIG. 1 depicts an example computing environment, according to an embodiment.

Aspects of the present disclosure provide apparatuses, methods, processing systems, and computer readable mediums for a dynamic web-based integrated development environment for developers.

A dynamic web-based integrated development environment can be implemented, which developers can access to create and/or update files for software program product(s). In some cases, the developers can create and/or update content files for the development of a software program. The content files can be domain specific language files that correspond to a specific domain knowledge. For example, content files can include calculation files. A calculation (calc) file or a calc graph can include a set of operations (e.g., encoded in a set of nodes) to calculate a result corresponding to the specific domain knowledge. In other cases, the developers can create and/or update resource files. Resource files include files such as schema, model, and calc files, which contain a set of validation rules. The validation rules can include grammar rules to apply to content files. In some cases, the content file can also include a set of validation rules to apply to other content files.

In order to create and/or update files (e.g., content files and/or resource files), the web-based integrated development environment can include a single backend server that can couple to a plurality of language server instances. Further, the web-based integrated development environment can include a web browser that is provided to developers, which can communicate with multiple language server instances.

In some cases, the web-based integrated development environment can evaluate a content file that a developer is creating and/or updating via the web browser (e.g., in real time and/or upon request from the developer via the computing device). The web-based integrated development environment can establish an initial connection with the client computing device, for example, via a Hypertext Transfer Protocol or other types of similar communication protocols.

For example, the client computing device can initiate the initial connection by accessing the web-based integrated development environment. In some cases, a client computing device can send a HTTP call to the web-based integrated development environment. In doing so, a content file for the web session is retrieved as well as a resource file. In some cases, the content file can be retrieved (upon request) from a database, network storage, etc. The content file can be loaded to the web session, and the resource file can be loaded to a language server instance. During the first communication connection, a mapping can also be identified between a web session identification provided by the client computing device to the web-based integrated development environment. With the web session identification, the web-based integrated development environment can retrieve and load the resource file to a first language server instance.

After the initial connection (e.g., a first communication connection) retrieves the files (e.g., content and resource files) and establishes a mapping to a language server instance, the initial connection can end, and a second communication connection can be established between a language server instance of the integrated development environment and the computing device based on the mapping. The second communication connection can be a continuous, bi-directional communication connection between the computing device and a language server instance.

Upon establishing the second communication connection to the first language server instance, the web-based integrated development environment can evaluate the content file on the client computing device via a first set of rules in the resource file.

Any edits or changes made to the content file can be saved to the web-based integrated development environment by disconnecting the second communication connection between the client computing device and web-based integrated development environment and establishing a new first and second communication connection. For example, once the second communication connection is disconnected between the client computing device and the first language server instance, a new first communication connection is established with the web-based integrated development environment (e.g., an HTTP put call). In the new first communication connection, a new web session identification can be received by the web-based integrated development environment along with an updated file (e.g., a content file and/or resource file). With the new web session identification, a new mapping can be identified for establishing a new second communication connection. Based on the new mapping, a new second communication connection can be established between the client computing device with an updated content file and/or an updated resource file loaded to a new language server instance.

In some cases, after the resource file and the content file are loaded to the web session, the client computing device can indicate a selection of another set of rules in a different resource file to evaluate the content file. Based on the selection from the client computing device, the web-based integrated development environment can retrieve the resource file with the corresponding set of rules and load the second resource file to a second language server instance that is coupled with the backend server. In some cases, all available resource files are retrieved and loaded to the respective language server instance (e.g., based on the first communication connection). In such cases, the resource file corresponding to the selection is applied to the content file when the computing device is connected to the language server instance. The web-based integrated server can disconnect a connection between the client computing device and the first language server instance and establish a new connection between the client computing device and the second language server instance in the web session. In particular, a new first communication connection and second communication connection are established between the client computing device and the second language server instance, after disconnecting the second communication with the first language server instance.

The second communication connection between the client computing device and each language server instance can be a real-time bi-directional continuous communication connection, such as, for example, a bi-directional web-socket connection. The second communication connection can be based on JSON-RPC protocols, Socket.io, and other similar types of protocols that establish real-time bi-directional continuous communication connections. Once the new connection with the second language server is established, the web-based integrated development environment can evaluate the content file on the client computing device with the second set of rules. The evaluation of the content file can be provided to the client computing device as a notification, message, etc.

In other cases, the web-based integrated development environment can receive a request from a client computing device for editing and/or updating a resource file that includes a set of validation rules. The web-based integrated development environment can provide the resource file to the client computing device and receive an updated version of the resource file. For example, the client computing device can edit and/or update the set of validation rules in the resource file. Once the client computing device provides the updated version of the resource file, the web-based integrated development environment can save the updated version of the resource file that can then be used for evaluating content files.

To do so, the client computing device can disconnect the current second communication connection with the web-based integrated development environment. Once disconnected, a new first communication connection can be established in which the updated resource file is transmitted to the web-based integrated development environment and stored. For the computing device to utilize the updated resource file, a new second communication connection is established in which the updated resource file is applied to the loaded content file based on a mapping included in the new first communication connection to a language server instance with the updated resource file.

With the web-based integrated development environment capable of switching language server instances and editing resource files as well as content files, developers can have greater flexibility when developing software programs. A client computing device connected to the web-based integrated development environment not only can change the set of validation rules applied to the content file (e.g., by retrieving a new resource file) but also can change the set of validation rules (e.g., by editing and/or updating a resource file). Further, the web-based integrated development environment can provide multi-tenant editing on demand as well as real-time evaluation(s) to a client computing device with capabilities described above, in part based on a single backend server coupled to a plurality of language server instances and communication connections established in a web session with the client computing device.

Example Computing Environment

FIG. 1 depicts an example computing environment 100. As illustrated, the example computing environment 100 includes a client computing device 102 (computing device) interacting with a web-based integrated development environment 104 (integrated development environment or IDE). The integrated development environment 104 can include a web browser module 106, a database 108, a backend server 110, and an initialization service 112.

A computing device 102 can include a computer, laptop, tablet, smart phone, or other such computing device with the same or similar capabilities. In some cases, the computing device 102 can be associated with a developer of the software program product. The developer can develop and update content file(s) 114 and/or resource file(s) 116 associated with the software program product via the integrated development environment 104.

In order to do so, the integrated development environment 104 provides a web browser to a computing device 102 via a web browser module 106. The web browser module 106 can generate a web browser for a computing device 102 to interact with the integrated development environment 104. The web browser module 106 can provide the web browser to the computing device 102 via a first communication connection. The first communication connection between the integrated development environment 104 and the computing device 102 can be based on Hypertext Transfer Protocol (HTTP), Hypertext Transfer Protocol Secure (HTTPS), or other similar communications protocols.

Once the web browser is provided to the computing device 102, the integrated development environment 104 can receive credentials and/or authentication information from the computing device 102 that authenticates the user of the computing device 102 to access a web session to create and/or edit files (e.g., content file(s) 114 and/or resource file(s) 116). For example, the integrated development environment 104 can receive a user name, identification, password, etc. of the user via the computing device 102. Along with the credentials, the integrated development environment 104 can receive a web session identification that identifies a web session that a user of the computing device 102 is associated with (e.g., a web session the user previously accessed and is now returning to continue working on a file or a new web session that is associated with the user's account).

With the web session identification, the integrated development environment 104 can initiate the web session with the computing device 102. For example, the integrated development environment 104 can retrieve one or more resource file(s) 116 (e.g., a first resource file) that correspond to the web session identification received from the user via the computing device 102. In some cases, the web session identification can be associated with a previously accessed web session (e.g., that the user is returning to). In other cases, the web session identification can be associated with a new web session.

Once the resource file 116 is retrieved, the resource file 116 is loaded to a first language server instance 118(1) coupled to the backend server 110. The backend server 110 can be coupled to a plurality of language server instances such that each language server instance coupled to the backend server 110 can host a different resource file 116.

In order to load the resource file 116 (e.g., a first resource file) to a first language server instance 118(1), a mapping 120 is identified in the backend server 110. The mapping 120 can indicate which language server instance a resource file 116 should be loaded. In some cases, the mapping 120 can be stored on a database, such as database 108. The initialization service 112 can retrieve the resource file 116. In some cases, the initialization service 112 can make a copy of the resource file 116. A copy can be made to preserve the current version of the set of validation rules in the resource file in case there is file damage, data loss, etc. The initialization service 112 can also load the resource file to the language server instance based on the mapping.

After loading the resource file 116 to the first language server instance 118(1), a web session is initiated by the integrated development environment 104 with the computing device 102 via a second communication connection. In some cases, the second communication connection can utilize WSS (secure web socket) or JSON-RPC protocols. For example, the second communication connection can be a bi-directional web socket connection (e.g., WSS) between the language server instance and the computing device. With the web session initiated, the integrated development environment 104 can provide a content file 114 and/or resource file 116, as requested via the computing device 102.

For example, a computing device 102 can request a content file 114 upon establishing the initial connection between the computing device 102 and the integrated development environment 104. The content file 114 can be a domain specific language file associated with a specific domain knowledge. In such cases, the integrated development environment 104 can retrieve the content file 114 from a database 108. The language server instance 118 with the resource file 116 can apply a set of validation rules (e.g., syntax grammar) to evaluate the content file 114 once the second communication connection is established. In some cases, the evaluation can be provided to the computing device 102 via a notification, a message, etc., indicating the results of the evaluation, such as syntax errors, recommendations, and so forth.

In some cases, the integrated development environment 104 can receive an indication from a user via the computing device 102 to apply a new set of validation rules to the content file. For example, a user can select a second set of validation rules to apply to the content file 114 in the web session. Based on the selection, the integrated development environment 104 can retrieve the corresponding resource file 116 (e.g., a second resource file) that includes the selected second set of validation rules. With the newly retrieved resource file 116, the integrated development environment 104 can load such resource file to a second language server instance 118(2) based on a mapping 120. In some cases, all available resource files 116 are loaded to the respective server instance, and a resource file 116 is applied to a content file 114 based on a selection of a user and the computing device 102 connecting to the respective language server instance.

Further, in such cases where a resource file 116 is selected to apply to a content file 114, the integrated development environment 104 disconnects the second communication connection between the first language server instance 118(1) and the computing device 102. After disconnecting the second communication connection, a new first communication connection and second communication connection are established. With the new first communication connection, the content file 114, the resource file 116, and a mapping 120 corresponding to a second resource file 116 are retrieved. The integrated development environment 104 establishes a new second communication connection between the second language server instance 118(2) based on the new mapping 120. The second language server instance 118(2) includes a second set of validation rules in the second resource file that can be applied to evaluate the content file 114 in the web session. A computing device 102 connected to the integrated development environment 104 has a greater degree of flexibility to switch between different sets of validation rules when creating and/or updating a content file 114.

In addition to the integrated development environment 104 providing via a computing device 102 the capability to apply and review different sets of validation rules to a content file 114, the integrated development environment 104 provides the capability to update and review the validation rules themselves. For example, if there is an update for a set of validation rules, the integrated development environment 104 can receive a request for the resource file 116 that includes the requested set of validation rules. Based on the request, the integrated development environment 104 can retrieve the resource file 116 from the database 108 and provide the resource file 116 to the computing device 102 in the web session.

Once the computing device 102 updates and provides the resource file 116 back to the integrated development environment 104, the updated resource file 116 is saved. For example, the updated resource file 116 can be saved in the database 108. To save the updated resource file 116 (or an updated content file 114), the current second communication connection between a language server instance and the computing device 102 is disconnected. A new first communication and second communication connection are established in which the updated file is received by the integrated development environment 104 via the new first communication connection. Additionally, the integrated development environment 104 updates the mapping accordingly to reflect the updated file and uses the updated mapping to establish a new second communication connection between the computing device and a language server instance.

The updated resource file 116 can be provided to other computing devices that the integrated development environment 104 has established web sessions, based on the web session identification, mapping, and/or request from the computing device 102.

In some cases, the integrated development environment 104 can establish multiple web sessions with the same computing device via a corresponding second communication connection (e.g., real-time, bi-directional continuous connection) for each web session. In such cases, after establishing the first communication connection between the integrated development environment 104 and the computing device 102, the integrated development environment 104 can receive a request to establish multiple web sessions. Based on the corresponding web session identification, the integrated development environment 104 can establish a second web session between each corresponding language server instance and the computing device 102. In some cases, the web session can be in a separate window on the computing device 102. For each web session, the integrated development environment 104 can load the same or a different resource file to the corresponding language server, based on the web session identification mapping.

Figure 2:
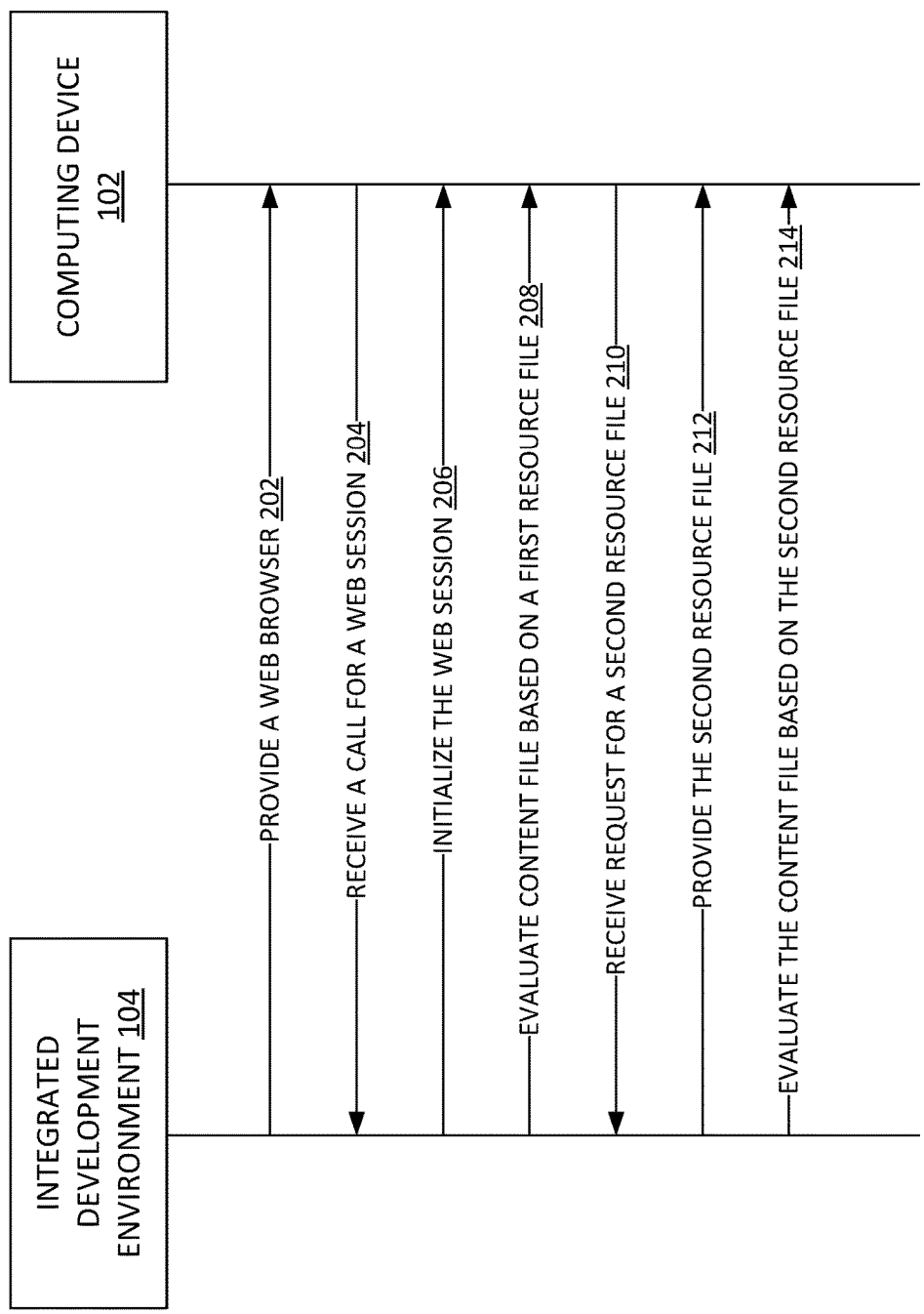
FIG. 2 depicts an example flow diagram of the integrated development environment implementing a capability, according to an embodiment.

Example Flow Diagram of the Integrated Development Environment Implementing a Capability FIG. 2 depicts an example flow diagram 200 of the integrated development environment implementing a capability.

In one embodiment, a first communication connection can be established between the integrated development environment 104 and the computing device 102. Based on the first communication connection, at 202, the integrated development environment 104 provides a web browser to the computing device 102. For example, the web browser can be provided via HTTP, HTTPS, or other similar communication protocols.

After providing the web browser, the integrated development environment 104 can receive at 204 a call from the computing device 102 for a web session. For example, the integrated development environment 104 can receive via the web browser a set of credentials. The set of credentials can authentic a user of the computing device 102 to access the files (e.g., content files and/or resource files) in the integrated development environment 104. In some cases, the set of credentials received from the computing device 102 can also include a web session identification. Based on the web session identification, the integrated development environment 104 can initialize at 206 a web session between the computing device 102 and a first language server instance that is coupled to a backend server of the integrated development environment 104, as described in FIG. 1.

Once the web session is initialized, the integrated development environment 104 can provide a content file to the computing device 102 along with loading a resource file to a corresponding language server. The resource file includes a set of validation rules that can be applied to evaluate 208 the content file. In some cases, the evaluation can be a real-time evaluation of the content file. For example, as a user is editing the content file in the web session, the integrated development environment 104 can apply the first set of rules in the resource file to generate an evaluation in real-time, which is available to view on the computing device 102 as issues arise (e.g., syntax errors, suggestions based on the validation rules, etc.). In other cases, the evaluation can be provided based on a request from the user via the computing device 102.

In the web session, a user can change the set of rules evaluating the content file. To do so, the integrated development environment 104 can receive 210 a request from a computing device 102 for a second resource file. The second resource file can include the second set of validation rules to apply to the content file. Once the integrated development environment 104 retrieves the second resource file and updates the web session with a new first and second communication connection between the computing device and a second language server instance, the integrated development environment 104 then provides 212 the second resource file to the computing device 102 to evaluate 214 the content file based on the set of validation rules of the second resource file.

Figure 3:
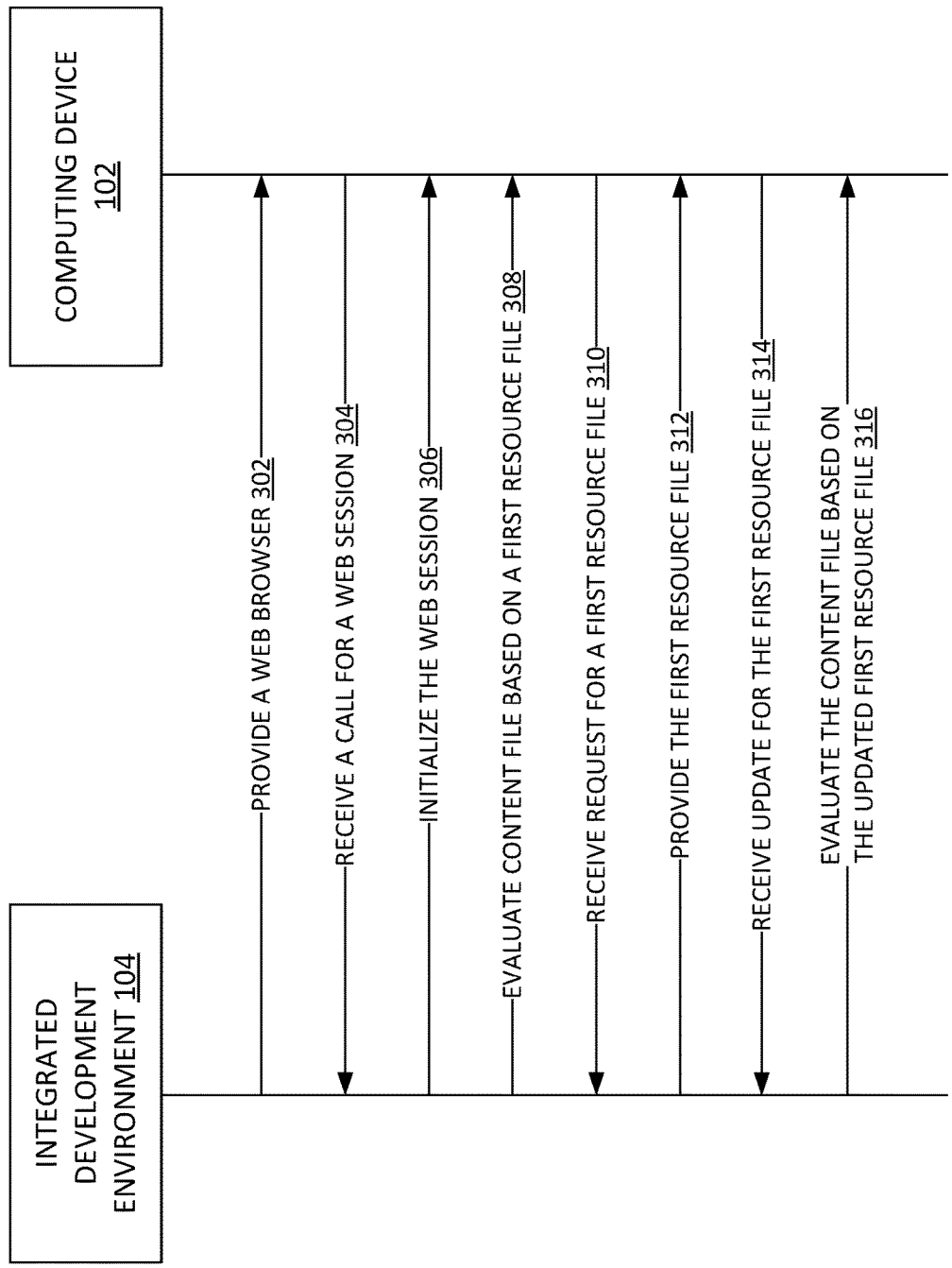
FIG. 3 depicts an example flow diagram of the integrated development environment implementing a capability, according to an embodiment.

Example Flow Diagram of the Integrated Development Environment Implementing a Capability FIG. 3 depicts an example flow diagram 300 of the integrated development environment implementing a capability.

As described in FIGS. 1-2, the integrated development environment 104 can provide 302 a web browser to a computing device 102, receive 304 a call for a web session, initialize 306 the web session, and evaluate 308 a content file based on a first resource file.

In some cases, during a web session, the integrated development environment 104 can receive 310 a request for the resource file itself. For example, a user can request the resource file to update one or more validation rules that are applied to the content file.

Upon receiving the request for the first resource file, the integrated development environment 104 can provide 312 the first resource file to the computing device 102. In some cases, the integrated development environment 104 can provide the first resource file to the user of a computing device 102 that has the requisite authority to access and/or update the resource file. For example, the integrated development environment 104 can review the credentials provided via the computing device 102 to confirm the authority to access and/or update the first resource file.

After the first resource file is provided to the computing device 102, the integrated development environment 104 can receive 314 an update for the first resource file that is saved so that going forward, future evaluations in web sessions (including the current web session) can apply the updated rules to a content file. For example, the integrated development environment 104 can evaluate 316 the content file based on the updated first resource file. In some cases, the integrated development environment 104 can evaluate other content files in other web sessions with the updated first resource file.

Figure 4:
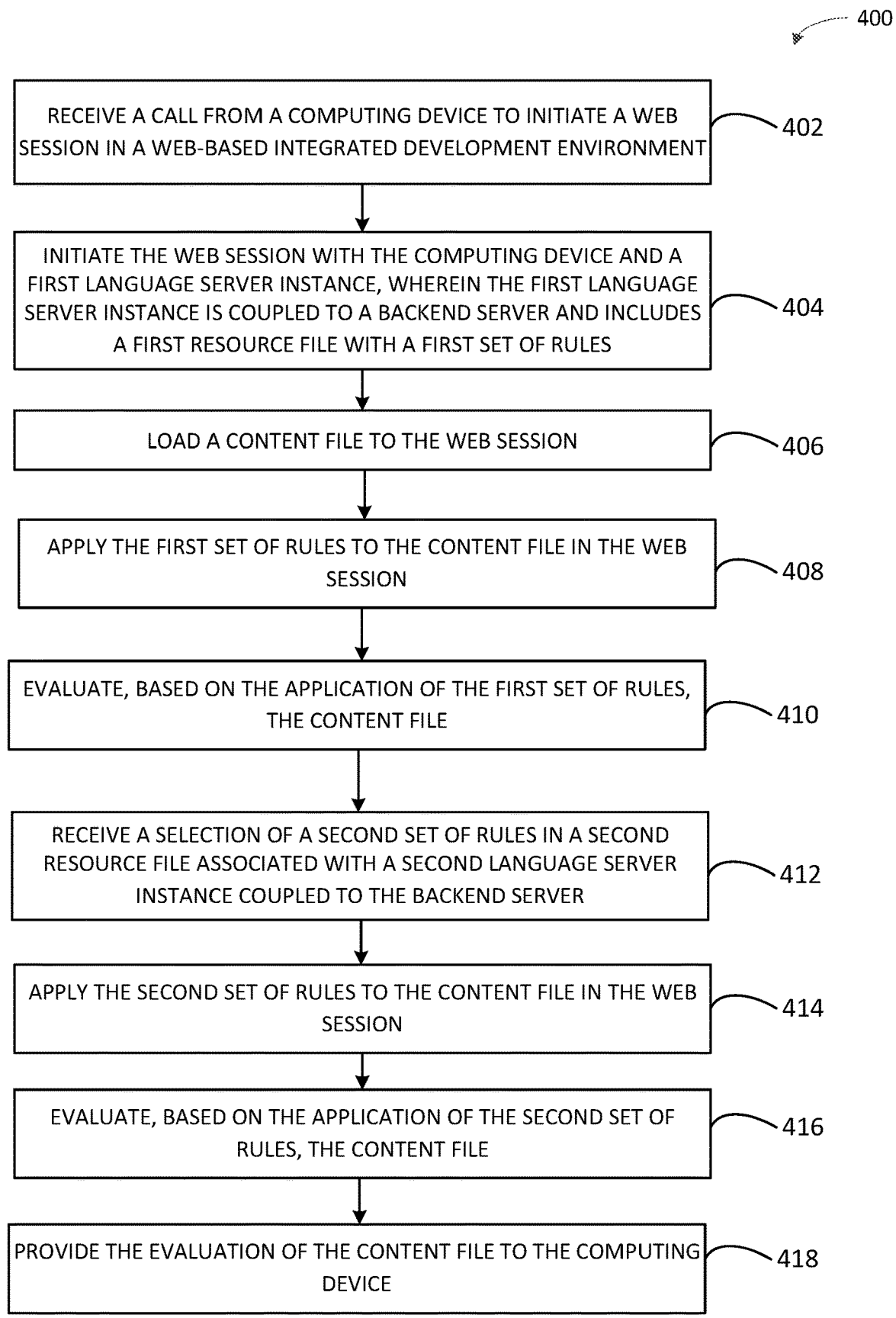
FIG. 4 depicts an example method of initiating a capability in the integrated development environment, according to an embodiment.

Example Method of Initiating a Capability in the Integrated Development Environment FIG. 4 depicts an example method 400 of initiating a capability in the integrated development environment At 402, an integrated development environment receives a call from a computing device to initiate a web session, as described in FIGS. 1-3.

At 404, the integrated development environment initiates the web session with the computing device and a first language server, wherein the first language server instance is coupled to a backend server and includes a first resource file with a first set of rules, as described in FIGS. 1-3.

At 406, the integrated development environment loads a content file to the web session, as described in FIGS. 1-3.

At 408, the integrated development environment applies the first set of rules to the content file in the web session, as described in FIGS. 1-3.

At 410, the integrated development environment evaluates, based on the application of the first set of rules, the content file, as described in FIGS. 1-3.

At 412, the integrated development environment receives a selection of a second set of rules in a second resource file associated with a second language server instance that is coupled to the backend server, as described in FIGS. 1-3.

At 414, the integrated development environment applies the second set of rules to the content file in the web session, as described in FIGS. 1-3.

At 416, the integrated development environment evaluates, based on the application of the second set of rules, the content file, as described in FIGS. 1-3.

At 418, the integrated development environment provides the evaluation of the content file to the computing device, as described in FIGS. 1-3.

Figure 5:
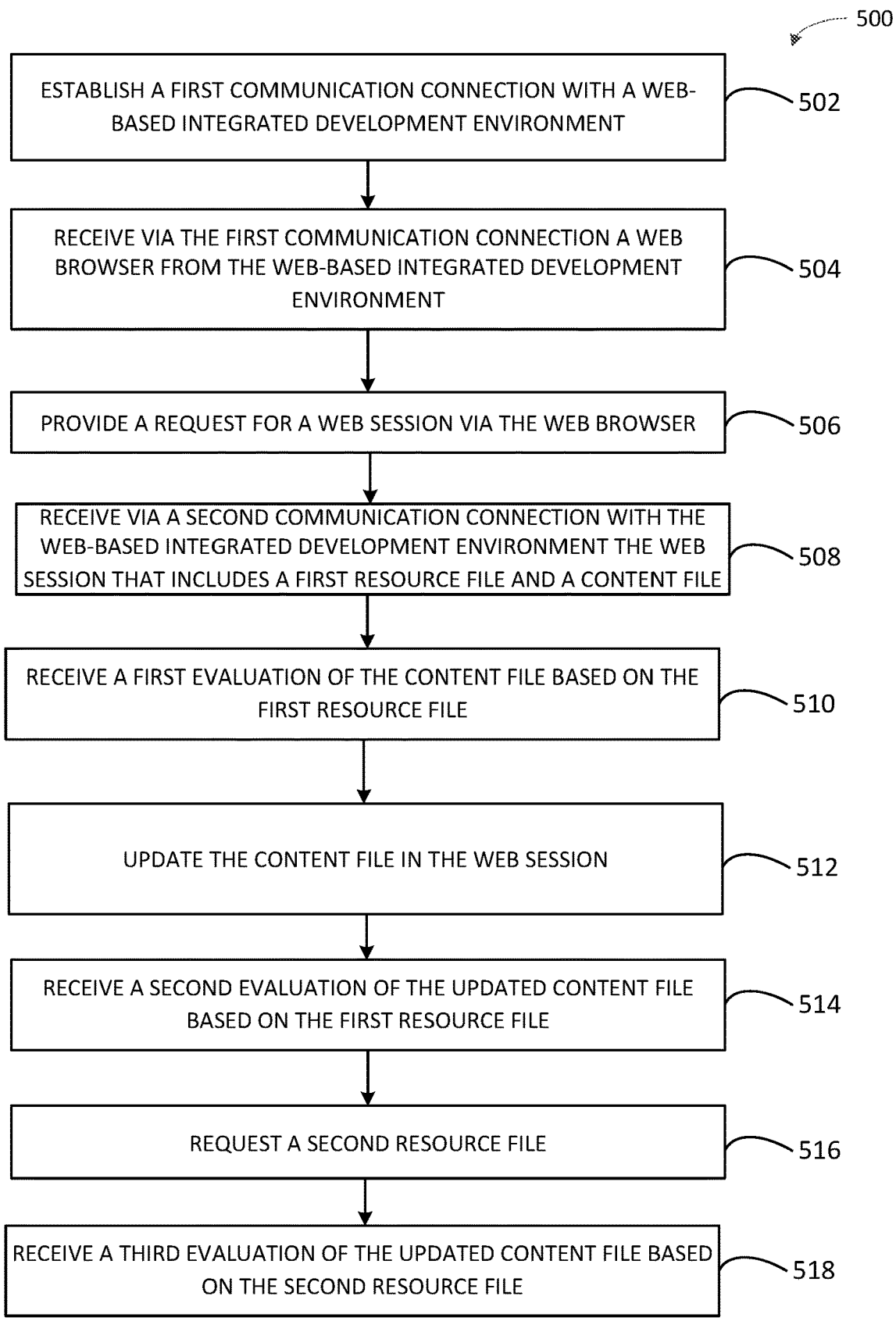
FIG. 5 depicts an example method of initiating a capability in the integrated development environment, according to an embodiment.

Example Method of Initiating a Capability in the Integrated Development Environment FIG. 5 depicts an example method 500 of initiating a capability in the integrated development environment.

At 502, a computing device establishes a first communication connection with an integrated development environment, as described in FIGS. 1-3.

At 504, the computing device receives via the first communication connection a web browser from the web-based integrated development environment, as described in FIGS. 1-3.

At 506, the computing device provides a request for a web session via the web browser, as described in FIGS. 1-3.

At 508, the computing device receives via a second communication connection with the web-based integrated development environment, the web session that includes a first resource file and a content file, as described in FIGS. 1-3.

At 510, the computing device receives a first evaluation of the content file based on the first resource file, as described in FIGS. 1-3.

At 512, the computing device updates the content file in the web session, as described in FIGS. 1-3.

At 514, the computing device receives a second evaluation of the updated content file based on the first resource file, as described in FIGS. 1-3. In some cases, the computing device can receive a real-time evaluation based on updates to the content file.

At 516, the computing device requests a second resource file, as described in FIGS. 1-3. For example, the computing device can select another set of validation rules to apply to the content file.

At 518, the computing device receives a third evaluation of the updated content file based on the second resource file, as described in FIGS. 1-3.

Further, in some cases, the computing device can also request a first resource file in the web session to edit. Upon receiving the first resource file, the computing device updates the first resource file in the web session. After the first resource file has been updated, the computing device provides the updated first resource file to the integrated development environment for other web sessions (including on the same or other computing devices with web sessions initiated by the integrated development environment).

Example Server

Figure 6:
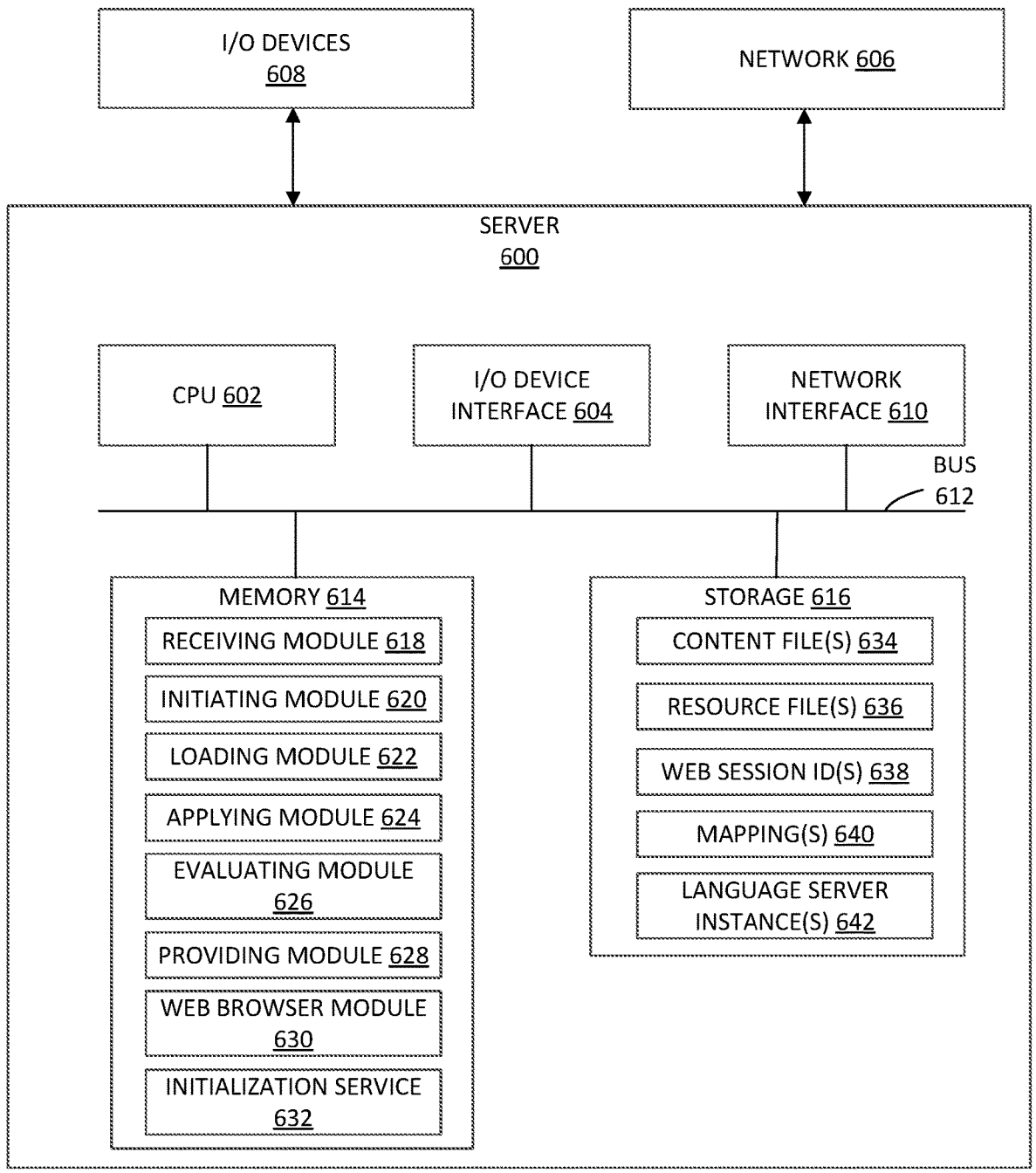
FIG. 6 depicts an example server, according to an embodiment.

FIG. 6 depicts an example server 600 that may perform the methods described herein, for example, with respect to FIG. 4. For example, the server 600 can be a physical server or a virtual (e.g., cloud) server and is not limited to a single server that performs the methods described herein, for example, with respect to FIGS. 1-4.

Server 600 includes a central processing unit (CPU) 602 connected to a data bus 612. CPU 602 is configured to process computer-executable instructions, e.g., stored in memory 614 or storage 616, and to cause the server 600 to perform methods described herein, for example, with respect to FIG. 4. CPU 602 is included to be representative of a single CPU, multiple CPUs, a single CPU having multiple processing cores, and other forms of processing architecture capable of executing computer-executable instructions.

Server 600 further includes input/output (I/O) device(s) 608 and interfaces 604, which allows server 600 to interface with input/output devices 608, such as, for example, keyboards, displays, mouse devices, pen input, and other devices that allow for interaction with server 600. Note that server 600 may connect with external I/O devices through physical and wireless connections (e.g., an external display device).

Server 600 further includes a network interface 610, which provides server 600 with access to external network 606 and thereby external computing devices.

Server 600 further includes memory 614, which in this example includes a receiving module 618, an initiating module 620, a loading module 622, an applying module 624, an evaluating module 626, a providing module 628, a web browser module 620, and an initialization service 632 for performing the operations as described in FIGS. 1-4.

Note that while shown as a single memory 614 in FIG. 6 for simplicity, the various aspects stored in memory 614 may be stored in different physical memories, but all accessible by CPU 602 via internal data connections such as bus 612.

Storage 616 further includes content file(s) 634, which may include a content file(s) provided to computing devices, as described in FIGS. 1-5.

Storage 616 further includes resource file(s) 636, which may include a resource file(s) provided to computing devices, as described in FIGS. 1-5.

Storage 616 further includes web session ID(s) 638, which may include web session ID(s), as described in FIGS. 1-5.

Storage 616 further includes mapping(s) 640, which may include web session ID(s), as described in FIGS. 1-5.

Storage 616 further includes language server instance(s) 642, which may include language server instance(s), as described in FIGS. 1-5.

While not depicted in FIG. 6, other aspects may be included in storage 616.

As with memory 614, a single storage 616 is depicted in FIG. 6 for simplicity, but various aspects stored in storage 616 may be stored in different physical storages, but all accessible to CPU 602 via internal data connections, such as bus 612, or external connections, such as network interfaces 604. One of skill in the art will appreciate that one or more elements of server 600 may be located remotely and accessed via a network 606.

Example Computing Device

Figure 7:
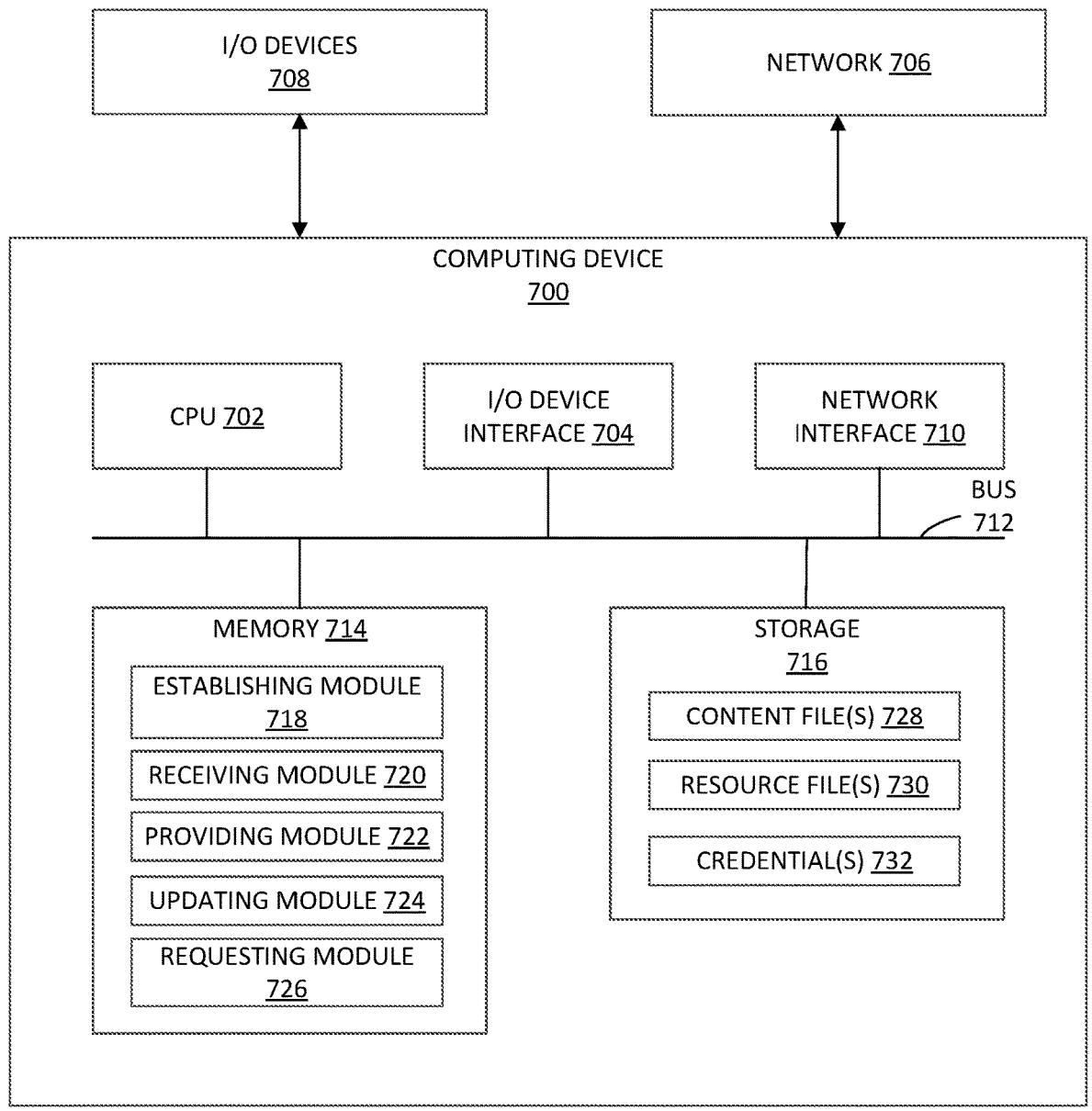
FIG. 7 depicts an example computing device, according to an embodiment.

FIG. 7 depicts an example computing device 700 that may perform the methods described herein, for example, with respect to FIG. 5. For example, the computing device 700 can be a computer, laptop, tablet, smartphone, a virtual machine, or other computing device with the same or similar capabilities.

Computing device 700 includes a central processing unit (CPU) 702 connected to a data bus 712. CPU 702 is configured to process computer-executable instructions, e.g., stored in memory 714 or storage 716, and to cause the computing device 700 to perform methods described herein, for example, with respect to FIG. 5. CPU 702 is included to be representative of a single CPU, multiple CPUs, a single CPU having multiple processing cores, and other forms of processing architecture capable of executing computer-executable instructions.

Computing device 700 further includes input/output (I/O) device(s) 708 and interfaces 704, which allows computing device 700 to interface with input/output devices 708, such as, for example, keyboards, displays, mouse devices, pen input, and other devices that allow for interaction with computing device 700. Note that computing device 700 may connect with external I/O devices through physical and wireless connections (e.g., an external display device).

Computing device 700 further includes a network interface 710, which provides computing device 700 with access to external network 706 and thereby external computing devices.

Computing device 700 further includes memory 714, which in this example includes an establishing module 718, a receiving module 720, a providing module 722, an updating module 724, a requesting module 726.

Note that while shown as a single memory 714 in FIG. 7 for simplicity, the various aspects stored in memory 714 may be stored in different physical memories, but all accessible by CPU 702 via internal data connections such as bus 712.

Storage 716 further includes content file(s) 728, which may include a content file(s) provided to computing devices, as described in FIGS. 1, 4.

Storage 716 further includes resource file(s) 730, which may include a resource file(s) provided to computing devices as described in FIGS. 1-3, 5.

Storage 716 further includes credential(s), as described in FIG. 1.

While not depicted in FIG. 7, other aspects may be included in storage 716.

As with memory 714, a single storage 716 is depicted in FIG. 7 for simplicity, but various aspects stored in storage 716 may be stored in different physical storages, but all accessible to CPU 702 via internal data connections, such as bus 1112, or external connections, such as network interfaces 704. One of skill in the art will appreciate that one or more elements of computing device 700 may be located remotely and accessed via a network 706.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
    receiving a call from a computing device to initiate a web session in a web-based integrated development environment;
    initiating the web session with the computing device and a first language server instance, wherein the first language server instance coupled to a backend server includes a first resource file with a first set of rules;
    loading a content file to the web session;
    applying the first set of rules to the content file in the web session;
    evaluating, based on the applying of the first set of rules, the content file;
    receiving a selection of a second set of rules in a second resource file associated with a second language server instance coupled to the backend server, wherein a connection between the first language server instance and the computing device is disconnected and a new connection between the second language server instance and the computing device is established based on the selection;
    applying the second set of rules to the content file in the web session;
    evaluating, based on the applying of the second set of rules, the content file; and
    providing results of the evaluating of the content file to the computing device.

2. The method of claim 1, further comprising providing a web browser to the computing device via a first communication connection.

3. The method of claim 1, wherein initiating the web session further comprises:
    determining a web session identification of the web session;
    retrieving the first resource file that corresponds to the web session identification; and
    loading the first resource file to the first language server instance coupled to the backend server.

4. The method of claim 3, wherein the loading of the first resource file to the first language server instance is based on a mapping of the web session identification to the first language server instance.

5. The method of claim 3, further comprising establishing the connection between the first language server instance and the computing device.

6. The method of claim 5, wherein the connection is a bi-directional web socket connection.

7. The method of claim 1, further comprising:
receiving a request from the computing device for the first resource file;
providing the first resource file to the computing device;
receiving an updated first resource file; and
updating the first language server instance with the updated first resource file.

8. The method of claim 1, further comprising initiating two or more concurrent web sessions in the web-based integrated development environment from the computing device.

9. A system comprising:
one or more processors; and
a memory storing instructions that, when executed by the one or more processors, cause the system to:
receive a call from a computing device to initiate a web session in a web-based integrated development environment;
initiate the web session with the computing device and a first language server instance, wherein the first language server instance coupled to a backend server includes a first resource file with a first set of rules;
load a content file to the web session;
apply the first set of rules to the content file in the web session;
evaluate, based on the applying of the first set of rules, the content file;
receive a selection of a second set of rules in a second resource file associated with a second language server instance coupled to the backend server, wherein a connection between the first language server instance and the computing device is disconnected and a new connection between the second language server instance and the computing device is established based on the selection;
apply the second set of rules to the content file in the web session;
evaluate, based on the applying of the second set of rules, the content file; and
provide results of the evaluating of the content file to the computing device.

10. The system of claim 9, wherein the instructions, when executed by the one or more processors, further cause the system to provide a web browser to the computing device via a first communication connection.

11. The system of claim 9, wherein initiating the web session further comprises:
determining a web session identification of the web session;
retrieving the first resource file that corresponds to the web session identification; and
loading the first resource file to the first language server instance coupled to the backend server.

12. The system of claim 11, wherein the loading of the first resource file to the first language server instance is based on a mapping of the web session identification to the first language server instance.

13. The system of claim 11, wherein the instructions, when executed by the one or more processors, further cause the system to establish the connection between the first language server instance and the computing device.

14. The system of claim 13, wherein the connection is a bi-directional web socket connection.

15. The system of claim 9, wherein the instructions, when executed by the one or more processors, further cause the system to:
receive a request from the computing device for the first resource file;
provide the first resource file to the computing device;
receive an updated first resource file; and
update the first language server instance with the updated first resource file.

16. The system of claim 9, wherein the instructions, when executed by the one or more processors, further cause the system to initiate two or more concurrent web sessions in the web-based integrated development environment from the computing device.

17. A method comprising:
receiving a call from a computing device to initiate a web session in a web-based integrated development environment;
initiating the web session with the computing device and a first language server instance, wherein the first language server instance coupled to a backend server includes a first resource file with a first set of rules;
loading a content file to the web session;
applying the first set of rules to the content file in the web session;
evaluating, based on the applying of the first set of rules, the content file;
receiving a selection of a second set of rules in a second resource file associated with a second language server instance coupled to the backend server, wherein, based on the selection:
a connection between the first language server instance and the computing device is disconnected;
a new first connection between the web-based integrated development environment and the computing device is established; and
a new second connection between the second language server instance and the computing device is established;
applying the second set of rules to the content file in the web session;
evaluating, based on the applying of the second set of rules, the content file; and
providing results of the evaluating of the content file to the computing device.

18. The method of claim 17, further comprising providing a web browser to the computing device via a first communication connection.

19. The method of claim 17, wherein initiating the web session further comprises:
determining a web session identification of the web session;
retrieving the first resource file that corresponds to the web session identification; and
loading the first resource file to the first language server instance coupled to the backend server.

20. The method of claim 19, wherein the loading of the first resource file to the first language server instance is based on a mapping of the web session identification to the first language server instance.

* * * * *